United States Patent [19]
Mason

[11] Patent Number: 5,421,441
[45] Date of Patent: Jun. 6, 1995

[54] STUB AXLE ASSEMBLY FOR CONVEYOR ROLLER

[76] Inventor: William R. Mason, 2322 Pine Tree Ct., Kissimmee, Fla. 34744

[21] Appl. No.: 199,611

[22] Filed: Feb. 22, 1994

[51] Int. Cl.$^6$ ............................................. B65G 13/00
[52] U.S. Cl. ................................... 193/35 R; 193/37
[58] Field of Search ............. 198/780, 781; 193/35 R, 193/37; 384/418, 419, 425; 403/242, 282

[56] References Cited

U.S. PATENT DOCUMENTS

| | | | |
|---|---|---|---|
| 3,353,644 | 11/1967 | McNash et al. | 193/37 |
| 4,415,074 | 11/1983 | Leinenger | 193/37 |
| 5,048,661 | 9/1991 | Toye | 193/37 |

Primary Examiner—Joseph E. Valenza
Attorney, Agent, or Firm—James H. Beusse

[57] ABSTRACT

A conveyor roller assembly comprises a roller supported at opposite ends on first and second opposing end supports with first and second axle members. Each of the axle members comprises a stub axle having one end securely fixed to a mounting flange. Each mounting flange is attached to a respective one of the end supports with the stub axles protruding into an adjacent end of the roller for supporting the roller between the end supports. A bearing member is inserted in each end of the roller for engaging the axle members. Preferably, the mounting flange comprises a molded plastic element having a generally flat, elongated configuration with a pair of spaced apertures for passing of mounting screws therethrough.

3 Claims, 1 Drawing Sheet

STUB AXLE ASSEMBLY FOR CONVEYOR ROLLER

The present invention relates to roller type conveyors and, more particularly, to a method and apparatus for supporting conveyor rollers on a stub axle.

BACKGROUND OF THE INVENTION

Conveyors using rollers, either passive or power driven, are common in the package handling industry where packages can span several rollers. Generally, the rollers extend between opposite side rails which act as roller end supports. Each roller rotates on an axle extending between the side rails and through the roller.

Roller type conveyors are also used in applications where products are handled without packaging. For example, in the citrus fruit industry, citrus may be processed on rollers wherein the conveyor is designed not only to move the citrus but to also facilitate inspection and separation. In some of these applications, the length of each roller may be as long as 72 inches requiring an axle length of at least about 75 inches. Insertion of the axle through such a long roller often presents a major problem since the axle is supported only at the roller ends. Significant force is required to support the six-foot length for insertion into a distal bearing. Accordingly, it is desirable to provide a method and apparatus for overcoming this problem.

In the citrus fruit industry, the rollers become coated with the sticky fluid inherent in the fruit peel or from juice escaping from damaged fruit. While it is desirable to clean the rollers, users are deterred from simply spraying water on the rollers by a rust problem associated with use of carbon steel axles. Although this problem could be resolved by the use of stainless steel axles, the cost of such axles normally prohibits their use in longer rollers. Accordingly, it is desirable to provide a method and apparatus for allowing use of stainless steel axles without incurring excess cost.

SUMMARY OF THE INVENTION

The above and other desirable features are obtained in a roller type conveyor system comprising a plurality of spaced rollers positioned between a pair of opposite side rails with the ends of the rollers generally adjacent to respective side rails. Each roller is supported for rotation on a pair of stub axle assemblies. Each axle assembly comprises a short or stub axle having one end embedded in a molded plastic flange. Each flange is adapted for attachment to a side rail with the stub axle protruding through the rail and into an adjacent end of one of the rollers. The flange is preferably bolted to the side rails with bolts passing through the rails at a spacing greater than the diameter of the roller so that the bolts do not interfere with the roller. In an alternate embodiment, the stub axle is formed with a hexagonal cross-section and fits within an insert which provides rotational engagement with the roller.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
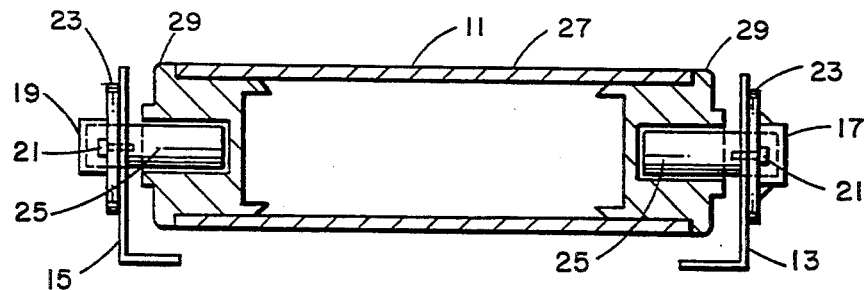
FIG. 1 is a partial cross-sectional view of a conveyor roller supported on a pair of axle assemblies in accordance with the present invention.

Referring now to FIG. 1, there is shown a cross-sectional view of a conveyor roller 11 mounted between a pair of opposite side rails 13 and 15 and supported in position on the side rails by means of a pair of opposing stub axle assemblies 17 and 19. The axle assemblies 17 and 19 are mounted to respective ones of the side rails 13,15 by means of bolts 21. Each of the axle assemblies 17,19 include an outer flange portion 23 and a stub axle 25. The conveyor roller comprises an outer cylindrical member 27 and a pair of opposing end members 29. The members 29 fit within the cylindrical element 27 as shown and are bonded in place using a conventional bonding means. Typically the cylindrical member 27 is a plastic extrusion such as a polyvinyl chloride pipe section and the inserts 29 are made of a material which can be bonded to the pipe section by means of an adhesive. The elements 29 may also be made out of polyvinyl chloride although it is preferable to make those elements out of another material such as DELRIN or polypropylene. The different material is preferable since the inner surface of the insert members 29 provide a bearing surface for the stub axles 25, i.e., the members 29 comprise bearing means for axles 25. While the conventional ball or roller bearings could be used to support roller 11 for rotation on axles 25, use of a plastic insert facilitates cleaning without introducing a rust problem.

Figure 2:
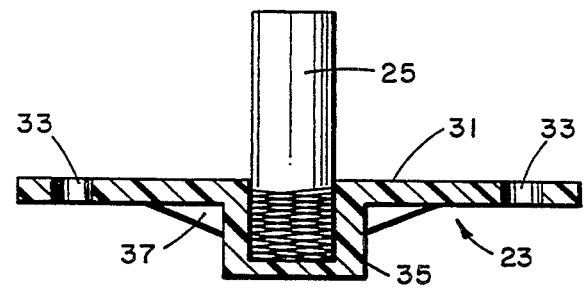
FIG. 2 is a cross-sectional view of one of the axle assemblies of FIG. 1.
Figure 3:
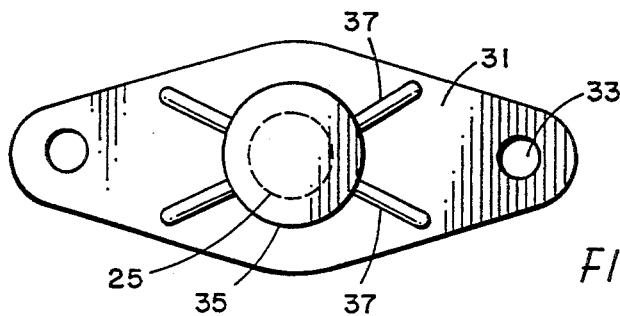
FIG. 3 is an end view of one of the axle assemblies of FIG. 1.

Referring to FIGS. 2 and 3, there is shown a more detailed view of one of the stub axle assemblies, such as axle assembly 17. The stub axle 25 is a cylindrical metal axle segment, preferably formed of stainless steel. One end of the axle assembly is knurled or otherwise roughened so as to provide a binding surface for the flange assembly 23. Preferably, the flange 23 is molded in place about the knurled end of stub axle 25. As shown, the flange comprises a generally flat plate 31 which is elongated into a generally oval configuration so that a pair of mounting holes 33 can be formed on opposite distal ends of the plate in a position to be outside the diameter of a roller rotating on the stub axle 25. This arrangement assures that the mounting bolts 21 do not interfere with operation of the roller 11. Centrally of the flat plate 31 there is a generally cylindrical raised portion 35 concentric with the stub axle 25 and extending from the flange in a direction opposite the direction in which the stub axle extends. The raised portion 35 has a diameter somewhat greater than a diameter of the axle 25 and encompasses the knurled end of the axle. For example, the axle 25 may have an outer diameter of 0.5 inch and the portion 35 may have an outer diameter of 0.75 inch. Additional support for the raised portion 35 is provided by a plurality of circumferentially spaced reinforcing elements 37 which attach the sides of the raised portion 35 to the upper surface of the plate 31. Preferably, the elements 37 are molded in place in combination with the flat plate 31 and raised portion 35. The flange assembly 23 may be molded from a glass fiber-filled nylon or polypropylene material.

In assembling the roller to the conveyor using the present invention, it will be noted that it is preferable to orient the elongate direction of the flat plate 31 such that it lies parallel to the direction of the side rail 13 or 15. In so doing, one of the stub axle assemblies 17 or 19 can be loosely attached to one of the rails and will generally pivot in a direction transverse to the direction in which the rail runs if the mounting holes are aligned as described. In this manner, the conveyor roller can be positioned onto the already installed one-axle assembly and then rotated downward to align the aperture in the opposite end with an aperture passing through the adjacent side rail. The second stub axle assembly can then be inserted through the side rail and into the adjacent end of the roller 11 and bolted into position. The opposite end axle assembly can then be tightened in place thereby positioning the roller in the form shown in FIG. 1.

Figure 4:
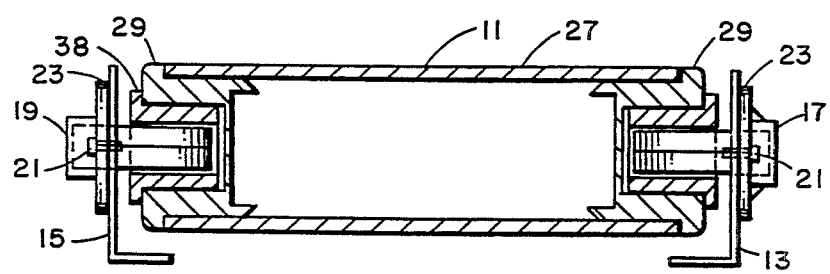
FIG. 4 is a cross-sectional similar to FIG. 1 showing an alternate embodiment of the invention.
Figure 5:
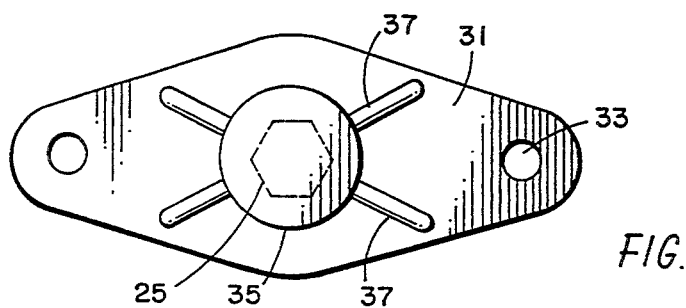
FIG. 5 is an end view of an axle assembly of FIG. 4.

FIGS. 4 and 5 illustrate an alternate form of the invention in which the stub axle 25 has a hexagonal cross-section, best seen in phantom lines in FIG. 5. This cross-section provides better gripping relationship between flange assembly 23 and axle 25. However, it does necessitate an additional bearing insert 38 to provide a rotational interface between the axle and roller 11. The insert 38 has an outer cylindrical configuration and an inner hexagonal aperture for receiving axle 25. The roller insert member 29 is formed with a slightly larger inner opening for receiving the insert 38. The insert 38 may be formed of a plastic material suitable for sliding engagement with members 29, such as, for example, TEFLON or other types of polypropylene.

It will be appreciated that the invention described above eliminates the problems previously associated with an unusually long axle assembly in conveyor rollers. The short stub axle assemblies can have a length of about two inches and a diameter of approximately one-half inch and provide support for a roller of length in excess of 72 inches. A typical roller used in the citrus fruit industry may have a diameter of about two and one-quarter inches requiring that the spacing between the holes 33 be approximately three inches. Accordingly, the flange plate 31 need only have an overall length of approximately three and three-quarter inches. Furthermore, it has been found that the flange when molded out of a glass filled polypropylene material need only have a thickness of about one-quarter inch to provide sufficient support for a roller having a length of six feet. Accordingly, the invention significantly reduces the cost of assembling a conveyor roller and allows the roller assembly to be washed without concern for rust due to water accumulation on the axles. The cost of using a stainless steel axle of two inches in length is significantly less than the cost of using a carbon steel rod of over six feet in length.

While the invention has been described in what is presently considered to be a preferred embodiment, various modifications will become apparent to those skilled in the art. Accordingly, it is intended that the invention not be limited to the specific described embodiment but be interpreted within the full spirit and scope of the appended claims.

What is claimed is:

1. A stub axle assembly for a conveyor roller comprising:
   a molded flange;
   an axle having one end embedded in said flange, said axle having a length substantially less than the length of the conveyor roller; and
   said flange comprising a generally flat member having an oval configuration with mounting holes passing through distal ends of said member and a generally cylindrical raised portion concentric with said axle and extending from said flange in a direction opposite a direction in which said axle extends, said raised portion having a diameter greater than a diameter of said axle and encompassing said one end of said axle.

2. The stub axle assembly of claim 1 wherein said flange further includes a plurality of circumferentially spaced reinforcement elements extending from said raised portion to said flat member.

3. The stub axle assembly of claim 1 wherein the mounting holes in said flat member are spaced apart a distance greater than a diameter of the conveyor roller.

* * * * *